United States Patent [19]
Kameyama

[11] Patent Number: 6,049,355
[45] Date of Patent: Apr. 11, 2000

[54] APPARATUS AND METHOD FOR CLAMPING AN IMAGE SIGNAL

[75] Inventor: Takashi Kameyama, Kanagawa, Japan

[73] Assignee: Sony Corporation, Tokyo, Japan

[21] Appl. No.: 08/833,736

[22] Filed: Apr. 9, 1997

[30] Foreign Application Priority Data

Apr. 12, 1996 [JP] Japan ..................................... 8-091384

[51] Int. Cl.$^7$ ..................................................... H04N 3/15
[52] U.S. Cl. .......................... 348/241; 348/222; 348/255; 348/697; 358/443; 358/446
[58] Field of Search ..................................... 348/222, 223, 348/224, 241, 242, 243, 255, 256, 250, 262, 265, 691, 694, 696, 697, 572; 358/443, 445, 446, 447

[56] References Cited

U.S. PATENT DOCUMENTS

| | | | |
|---|---|---|---|
| 5,268,765 | 12/1993 | Yamashita | 348/245 |
| 5,400,074 | 3/1995 | Shimizu | 348/255 |
| 5,521,639 | 5/1996 | Tomura et al. | |
| 5,737,018 | 4/1998 | Shimizu et al. | 348/255 |

FOREIGN PATENT DOCUMENTS

| | | |
|---|---|---|
| 5-153428 | 6/1993 | Japan . |
| 5-153429 | 6/1993 | Japan . |
| 5-153430 | 6/1993 | Japan . |
| 5-153431 | 6/1993 | Japan . |
| 6-303458 | 10/1994 | Japan . |

*Primary Examiner*—Wendy Garber
*Assistant Examiner*—Mitchell White
*Attorney, Agent, or Firm*—Frommer Lawrence & Haug, LLP.; William S. Frommer

[57] ABSTRACT

A clamping circuit for use in a video camera varies a level of an image signal utilizing an analog feedback control signal, converts the varied image signal to a digital image signal, generates a digital zone value signal that corresponds to a level of a reference zone of the digital image signal, digitally detects an amount of error between the digital zone value signal and a predetermined zone value having a non-zero fractional portion, generates from the detected amount of error a digital error signal that has a predetermined number of data bits, switches between a coarse adjustment mode and a fine adjustment mode of the clamping circuit in accordance with a level of the digital error signal, generates, in the coarse adjustment mode, a pulse width modulated signal from the most significant bits of the digital error signal, generates, in the fine adjustment mode, the pulse width modulated signal from the least significant bits of the digital error signal, and generates from the generated pulse width modulated signal the analog feedback control signal.

20 Claims, 17 Drawing Sheets

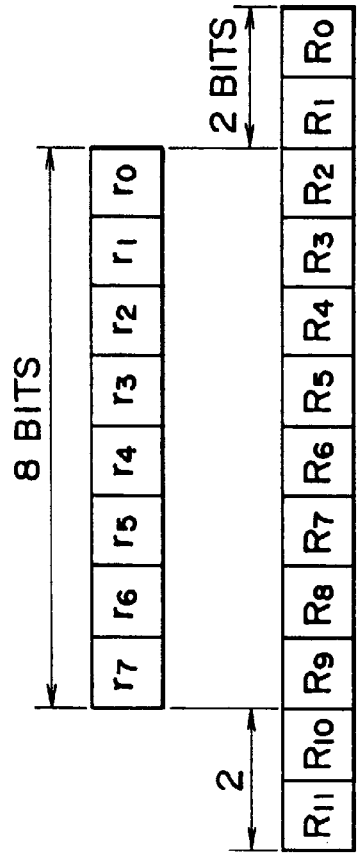
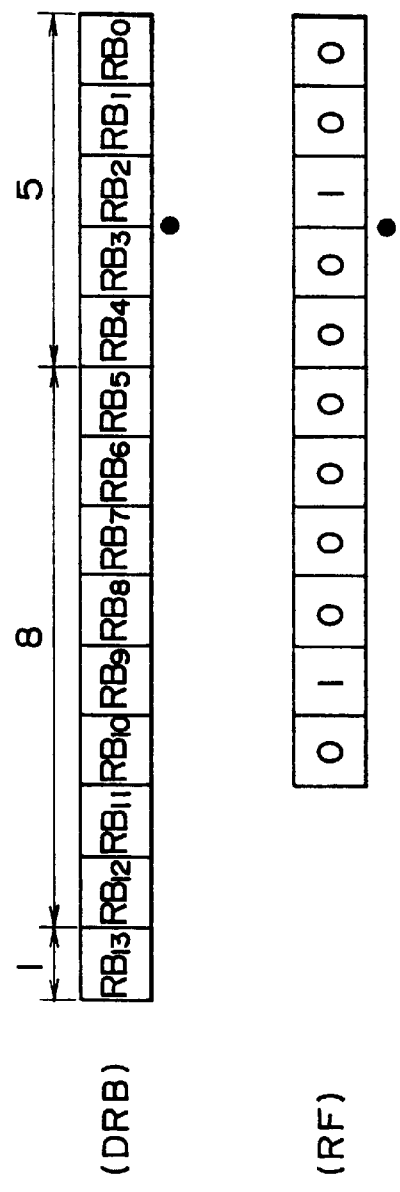
F I G. 3A (Dr)
F I G. 3B (DR)
F I G. 3C (DRB)
F I G. 3D (RF)

FIG. 7

| MDC | MD | |
|---|---|---|
| | MSB | LSB |
| (0)$_{16}$ | 0 0 0 0 | 0 0 0 0 |
| (1)$_{16}$ | 0 0 0 0 | 1 0 0 0 |
| (2)$_{16}$ | 0 0 0 0 | 1 1 0 0 |
| (3)$_{16}$ | 0 0 0 0 | 1 1 1 0 |
| (4)$_{16}$ | 0 0 0 0 | 1 1 1 1 |
| (5)$_{16}$ | 1 0 0 0 | 1 0 0 0 |
| (6)$_{16}$ | 1 0 0 0 | 1 1 0 0 |
| (7)$_{16}$ | 1 0 0 0 | 1 1 1 0 |
| (8)$_{16}$ | 1 0 0 0 | 1 1 1 1 |
| (9)$_{16}$ | 1 1 0 0 | 1 1 0 0 |
| (A)$_{16}$ | 1 1 0 0 | 1 1 1 0 |
| (B)$_{16}$ | 1 1 0 0 | 1 1 1 1 |
| (C)$_{16}$ | 1 1 1 0 | 1 1 1 0 |
| (D)$_{16}$ | 1 1 1 0 | 1 1 1 1 |
| (E)$_{16}$ | 1 1 1 1 | 1 1 1 1 |
| (F)$_{16}$ | 1 1 1 1 | 1 1 1 1 |

FIG. 12A (CNT)
FIG. 12B (SEC)
FIG. 12C (FLG)

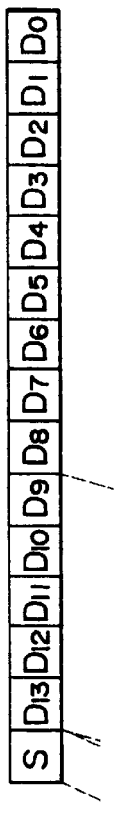
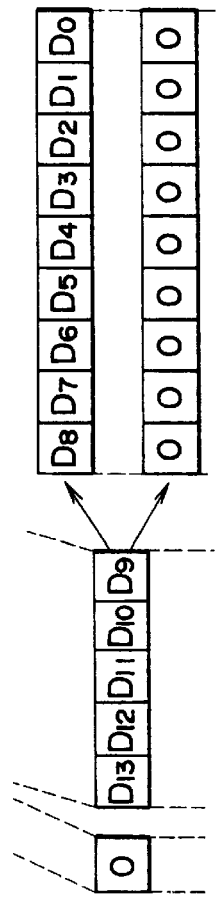
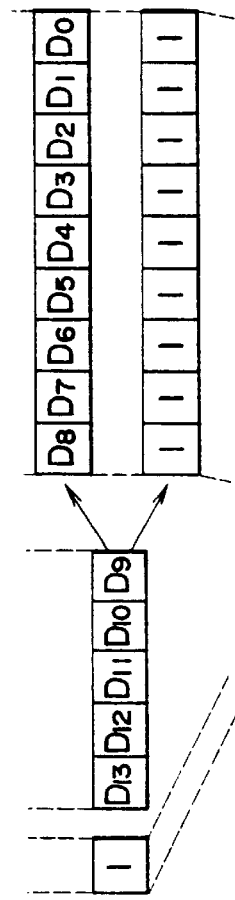
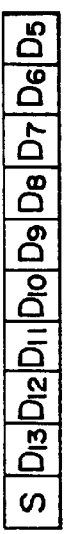
F I G. 14A (DER)
F I G. 14B S=0
F I G. 14C S=1
F I G. 14D (DTF)
F I G. 14E (DTC)

|  | SEC | | | | | | | |
|---|---|---|---|---|---|---|---|---|
|  | 0 | 1 | 2 | 3 | 4 | 5 | 6 | 7 |
| 0 | 0 | 0 | 0 | 0 | 0 | 0 | 0 | 0 |
| 1 | 1 | 0 | 0 | 0 | 0 | 0 | 0 | 0 |
| 2 | 1 | 0 | 0 | 0 | 1 | 0 | 0 | 0 |
| RES 3 | 1 | 0 | 1 | 0 | 0 | 1 | 0 | 0 |
| 4 | 1 | 0 | 1 | 0 | 1 | 0 | 1 | 0 |
| 5 | 1 | 1 | 1 | 0 | 1 | 0 | 1 | 0 |
| 6 | 1 | 1 | 1 | 0 | 1 | 1 | 1 | 0 |
| 7 | 1 | 1 | 1 | 1 | 1 | 1 | 1 | 0 |

APPARATUS AND METHOD FOR CLAMPING AN IMAGE SIGNAL

BACKGROUND OF THE INVENTION

The present invention relates to a video camera and, more particularly, to apparatus and method for clamping an image signal for use in a video camera.

As is known, analog image signals output from image pickup devices are supplied to a feedback clamp circuit prior to being processed in various manners including, for example, linear mask processing, gamma correction, and knee correction, in order to produce a video signal. The feedback clamp circuit converts the analog image signal to a digital signal, generates an error signal from the difference between the digital signal and a digital-code signal representing a reference level, converts by means of integration the error signal to an analog signal, and adds the analog signal to the originally supplied image signal. The feedback clamp circuit operates to control the level of the analog image signal to a predetermined level. However, to provide linear feedback clamping with a high degree of accuracy, the generated error signal must have a word length of, for example, eight to twelve bits, thus requiring a relatively large number of input pins (i.e., terminals) to exist in the feedback clamping circuit. To overcome this problem, a digitally converted image data signal is compared to a reference level to produce a one-bit flag signal that indicates whether or not the digital image data signal exceeds the reference level, and the flag signal is utilized to determine whether linear feedback clamp processing is necessary. However, since the least significant bit (LSB) of the digital image data signal fluctuates in accordance with the value of the flag signal, the level of the image data signal also fluctuates (i.e., oscillates).

When the image data signal is suppressed by suppressing the level variations thereof (which occur due to the flag signal) to converge the image data signal, such convergence generally takes a relatively long time. Thus, the initial power-on procedure also requires a relatively long time. Still further, convergence of the image data signal also takes a relatively long time when the level of the image data signal exceeds the reference level during an image pickup operation, thus resulting in excessive delays before an image can be picked up by the imaging device.

OBJECTS OF THE INVENTION

Therefore, it is an object of the present invention to provide apparatus and method for clamping an image signal which overcome the shortcomings of the above described devices.

Another object of the present invention is to provide a clamp circuit which carries out a linear feedback clamping operation with a high degree of stability as well as with a high degree of accuracy.

An additional object of this invention is to provide a clamping technique in which an image signal is converged in a relatively short time.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for receiving an analog image signal having a plurality of periods (i.e., vertical intervals), varying a level of a reference zone (e.g., an optical black level zone) in the analog image signal in accordance with an analog control signal, converting the varied analog image signal to a digital image signal, generating a digital zone value signal corresponding to a level of the digital image signal in the reference zone, digitally detecting an amount of error between the digital zone value signal and a predetermined zone value, generating a digital error signal having a predetermined number of data bits from the detected amount of error, switching between a coarse adjustment mode and a fine adjustment mode in accordance with a level of the digital error signal, and generating the analog control signal in the coarse adjustment mode from the most significant bits of the digital error signal, and, in the fine adjustment mode, from the least significant bits of the digital error signal.

As one aspect of the present invention, switching from the coarse adjustment mode to the fine adjustment mode occurs when the digital error signal is less than a first predetermined signal level, and switching from the fine adjustment mode to the coarse adjustment mode occurs when the digital error signal is greater than a second predetermined signal level that is greater than or equal to the first predetermined signal level so as to produce a hysteresis effect.

As a feature of this aspect, switching from the fine adjustment mode to the coarse adjustment mode also occurs when the digital error signal is greater than a third predetermined signal level that is greater than the second predetermined signal level, and the digital error signal level is established for a predetermined period of time at the level of the previous digital error signal prior to when it was greater than the third predetermined signal level.

As another aspect of the present invention, the received analog image signal is comprised of a plurality of image signals each corresponding to a respective color, respective amounts of error for each respective color are detected, respective digital error signals are generated from the respective detected amounts of errors, and switching from the coarse adjustment mode to the fine adjustment mode occurs when all of the digital error signals are smaller than the first predetermined signal level, and switching from the fine adjustment mode to the coarse adjustment mode occurs when any one of the digital error signals is greater than the second predetermined signal level.

As yet a further aspect of the present invention, a pulse width modulated signal is generated a predetermined number of times during a time that corresponds to a video portion of each period of the analog image signal not in the reference zone, and the analog control signal is generated from the pulse width modulated signal.

As yet another aspect of the present invention, an imaging sensor images an image to produce the analog image signal and the reference zone of the image signal represents a pixel zone having an optical black level.

In accordance with another embodiment of the present invention, apparatus and method are provided for receiving an analog image signal, varying a level of a reference zone of the analog image signal in accordance with an analog control signal, converting the varied analog image signal to a digital image signal, generating a digital zone value signal corresponding to a level of the digital image signal in the reference zone, digitally detecting an amount of error between the digital zone value signal and a predetermined zone value, generating a pulse width modulated signal corresponding to the detected amount of error, and generating the analog control signal from the generated pulse width modulated signal.

In accordance with a further embodiment of the present invention, apparatus and method are provided for receiving an analog image signal, varying a level of the analog image signal in accordance with an analog control signal, converting the varied analog image signal to a digital image signal, generating a digital zone level signal representing an average value of levels of a reference zone in the digital image signal, the digital zone level signal including a fractional portion, detecting an amount of error between the digital zone level signal and a predetermined zone level, the predetermined zone level having a non-zero fractional portion, generating a digital error signal in accordance with the detected amount of error, and generating the analog control signal from the digital error signal.

As one aspect of this embodiment of the present invention, a generated pulse width modulated signal is modulated by the digital error signal a predetermined number of times at predetermined intervals during a time that corresponds to a video portion of each period of the analog image signal not in the reference zone, pulse widths of selected portions of the pulse width modulated signal are modified in accordance with the fraction portion of the digital error signal, and the analog control signal is generated from the modified pulse width modulated signal.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 3A to 3D illustrate values of various signals and which are useful for explaining the clamping operation of the present invention;

FIG. 7 is a mode control signal MDC conversion table;

FIGS. 12A to 12C illustrate the values of the various outputs of counter unit 98;

FIGS. 14A to 14E illustrate the data structure of various signals in data trimming unit 54;

DETAILED DESCRIPTION OF CERTAIN PREFERRED EMBODIMENTS

Figure 1:
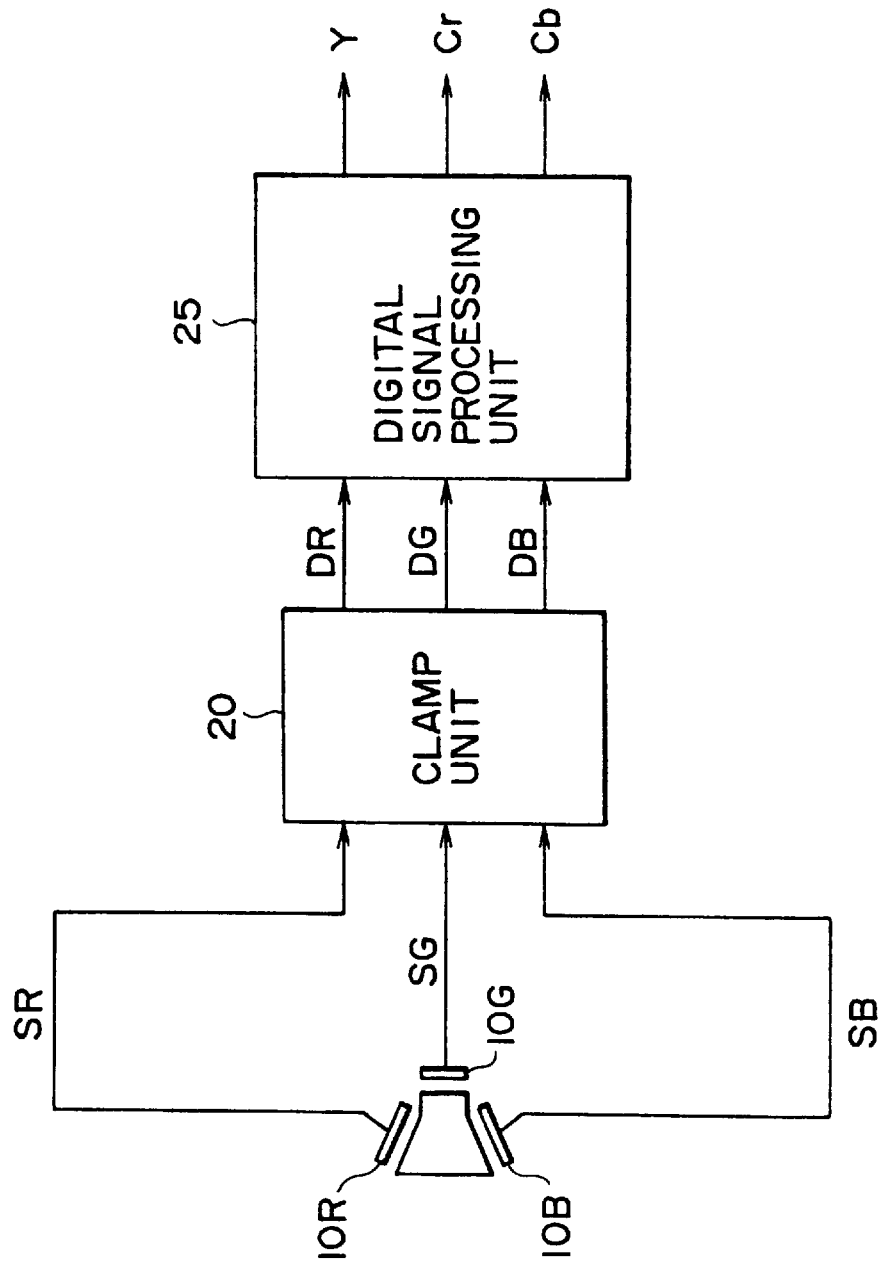
FIG. 1 is a block diagram of a video camera embodying the clamping circuit of the present invention.

Referring now to the drawings, FIG. 1 is a block diagram of a video camera embodying the clamping circuit of the present invention. As shown, the video camera is comprised of three solid state image pickup devices, 10R, 10B and 10G (hereinafter, CCD image sensors), a clamp unit 20 and a digital signal processing unit 25. An image is picked up by the CCD image sensors, wherein CCD image sensors 10R, 10G and 10B produce image signals SR, SG and SB, respectively, corresponding to the three primary colors. Signals SR, SB and SG are supplied to clamp unit 20 which clamps the levels of the supplied signals to a predetermined level and which convert the clamped signals to respective digital image signals DR, DG and DB. Digital image signals DR, DG and DB are supplied to digital signal processing unit 25 which performs various processing on the digital signals including linear matrix processing, gamma correction, knee correction, etc., in a manner well known in the art, and also converts the processed signals to corresponding luminance signal Y and color difference signals Cr and Cb. Luminance signal Y and color difference signal Cr and Cb are output from the video camera and supplied, for example, to a video tape recorder (not shown).

Figure 2:
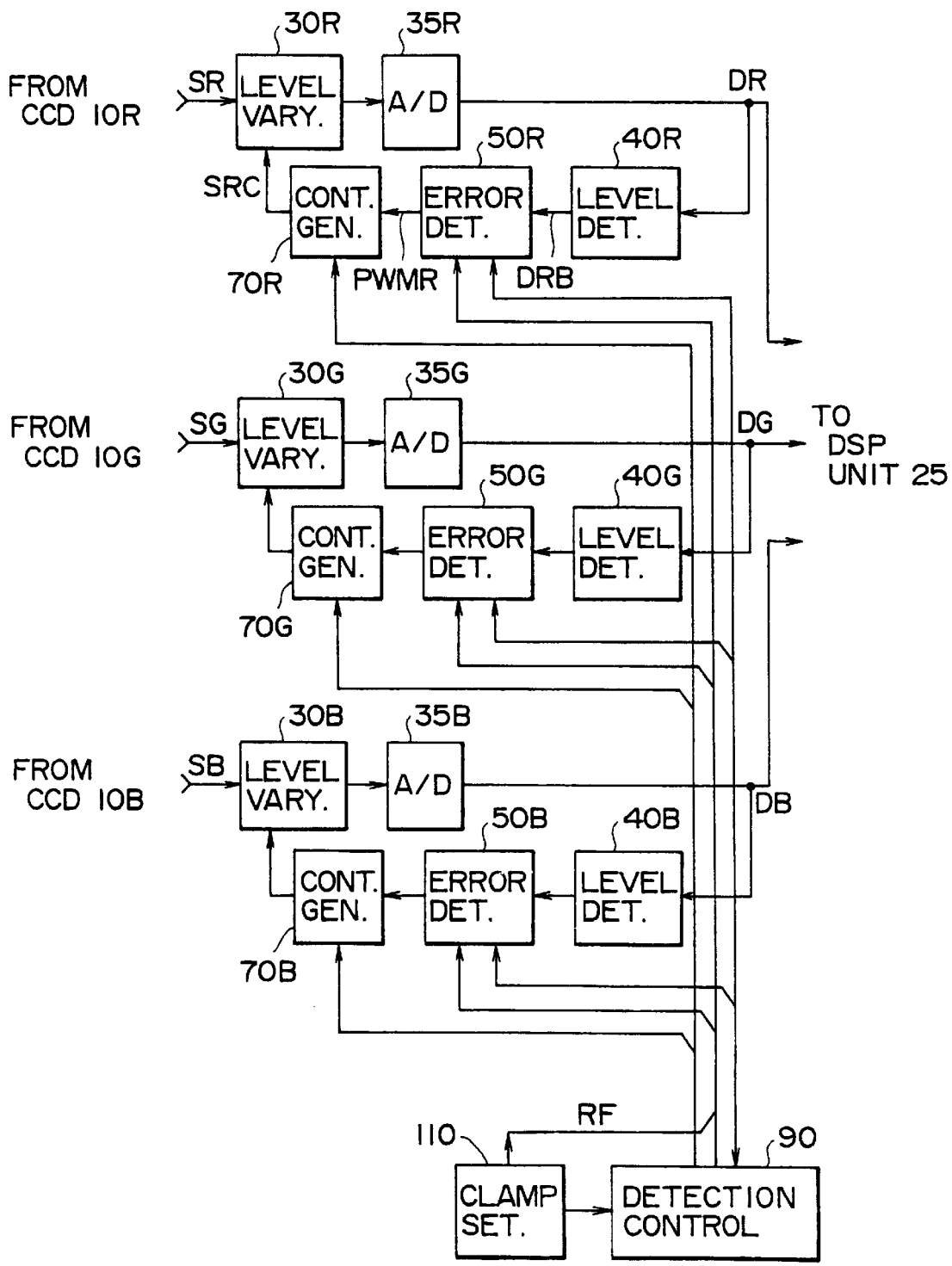
FIG. 2 is a block diagram of clamp unit 20 shown in FIG. 1 in accordance with the present invention.

Referring next to FIG. 2, a block diagram of clamp unit 20 is shown as being comprised of parallel red, green and blue processing circuits, as well as a detection operation control unit 90 and a clamp operation setting unit 110. The red, green and blue processing circuits are identical to one another and, thus, for purposes of brevity herein, only the red processing circuit will be described, and it will be understood that the green processing circuit and the blue processing circuit each operates in an identical manner to the below described red processing circuit.

The red processing circuit is comprised of a level varying unit 30R, an analog to digital (A/D) converter 35R, a level detecting unit 40R, an error detecting unit 50R and a control signal generating unit 70R. Similarly, the green processing circuit is comprised of circuits 30G, 35G, 40G, 50G and 70G, and the blue processing circuit is comprised of circuits 30B, 35B, 40B, 50B and 70B.

Red analog image signal SR is supplied to level varying unit 30R which, in response to a control signal SRC supplied from control signal generating unit 70R (to be discussed), varies the level of red analog image signal SR. In one embodiment of the present invention, level varying unit 30R reduces the level of red analog image signal SR by control signal SRC. The resultant signal is supplied to A/D converter 35R which converts the supplied signal to digital image signal DR which is supplied as an output signal of clamp unit 20 and which also is supplied to level detecting unit 40R. As previously mentioned, digital image signal DR is supplied to digital signal processing unit 25 shown in FIG. 1.

Figure 4A:
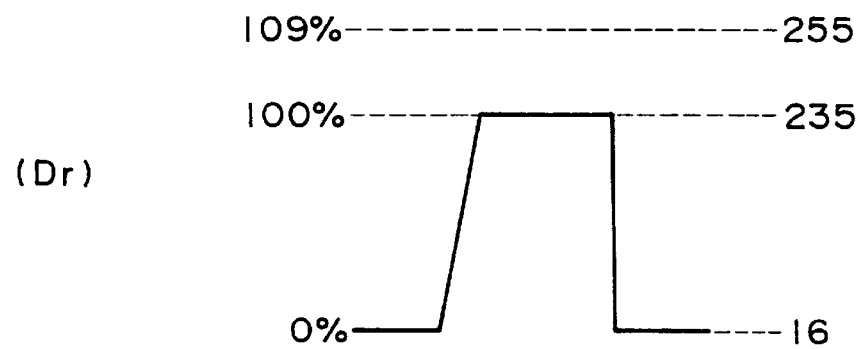
FIGS. 4A and 4B are block diagrams of dynamic ranges of the video camera embodying the clamp circuit of the present invention.
Figure 4B:
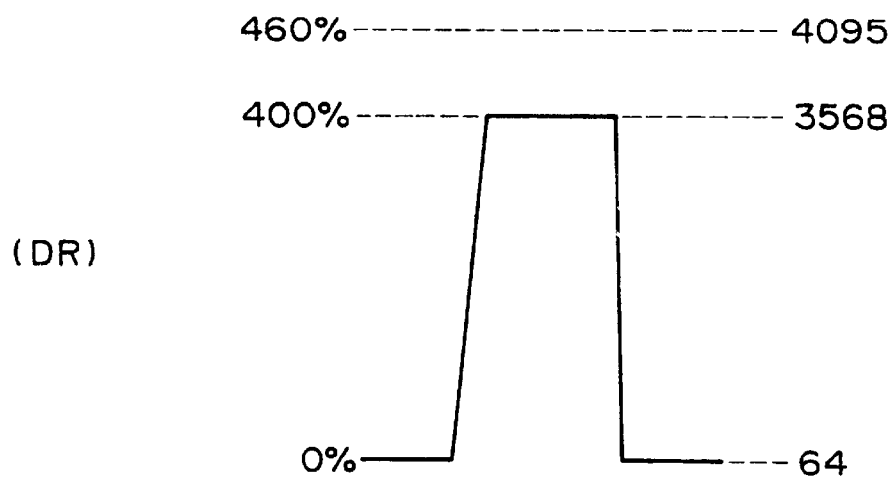

Level detecting unit 40R samples a signal from red image signal DR for a pixel zone of the optical black level of CCD image sensor 10R, and an average value data signal DRB is generated therefrom which represents an average value of the sampled signal. Referring to FIGS. 3A and 3B, FIG. 3A represents a data signal "Dr" produced from 8-bit quantization of the video signal of D1 format and FIG. 3B represents data signal "DR" having an expanded dynamic range as well as an improved resolution, resulting from (2,8,2) bit A/D conversion to produce the 12-bit signal DR. Data signal Dr is produced from quantization of a 0% signal to the value 16 (base 10) (also identified as $(16)_{10}$), and a 100% signal to the value $(235)_{10}$, such as shown in the waveform of FIG. 4A, and data signal DR is provided by expressing the 0% signal as the value $(64)_{10}$ and a 400% signal as the value $(3568)_{10}$, such as shown in the waveform of FIG. 4B. Referring again to FIGS. 3A and 3B, bits R1 and R0 represent appended least significant bits, bits R2–R9 correspond to the level of the video signal (without the expanded dynamic range and improved resolution), and bits R10 and R11 are added to provide an expanded dynamic range. Level detecting unit 40R produces average value signal DRB having the data structure shown in FIG. 3C, and, as shown, has a (1,8,5) bit data value, wherein bits $RB_0$, $RB_1$ and $RB_2$ represent fractional portions of the signal, and since signal DRB is an average value signal which indicates the average value of the black level, the most significant bit (e.g., bit $RB_{14}$ (not shown)) is clipped (removed or not used) so as to reduce the number of bits of signal DRB.

Figure 5:
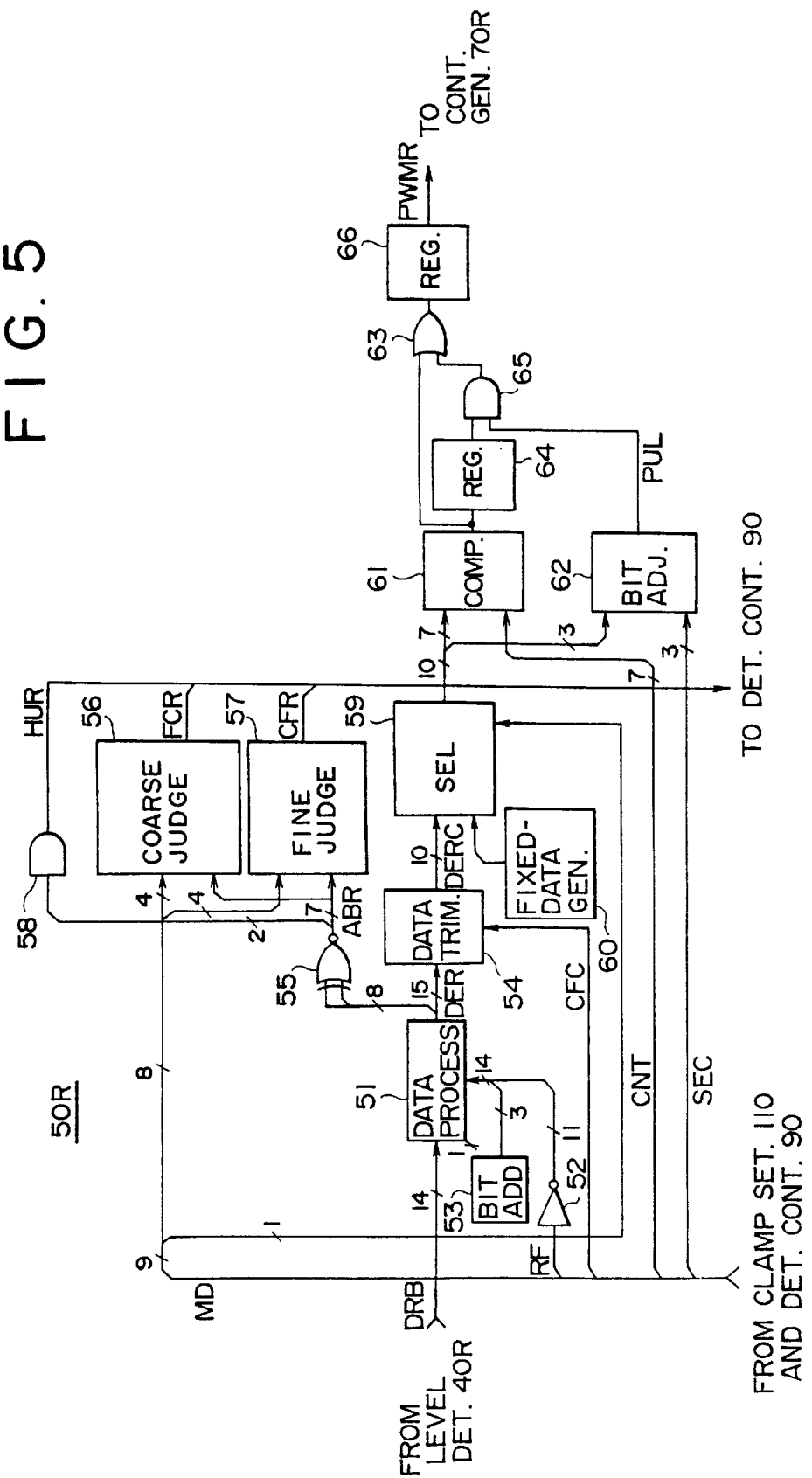
FIG. 5 is a block diagram of error detecting unit 50R shown in FIG. 2 in accordance with the present invention.

Average value signal DRB is supplied to error detecting unit 50R which is schematically shown in block diagram form in FIG. 5. Error detecting unit 50R is comprised of a number of circuits including a data processing unit 51, an inverter 52, a bit adding unit 53, a data trimming unit 54, an exclusive NOR gate 55, a coarse adjustment mode switching circuit 56 (coarse adjustment mode switching judging unit 56), a fine adjustment mode switching circuit 57 (fine adjustment mode switching judging unit 57), an AND gate 58, a selector 59, a fixed data generating unit 60, a comparator unit 61, a bit-adjusting unit 62, an OR gate 63, a register 64, an AND gate 65 and a register 66. Average value signal DRB output from level detecting unit 40R is supplied to data processing unit 51. Clamp operation setting unit 110 (shown in FIG. 2) supplies to error detecting unit 50R a reference signal RF representing a black level reference signal having, for example, the 11-bit value $(01000000100)_2$, as shown in FIG. 3D. Like signal DRB (FIG. 3C), reference signal RF includes three fraction bits and which have the value $(100)_2$ representing the value $(0.5)_{10}$. The 8-bit integer portion of reference signal RF corresponds to the value $(64)_{10}$. As will be discussed, providing reference signal RF with a fractional portion results in the prevention of the above mentioned oscillation that is encountered in prior art devices.

Reference signal RF is supplied to inverter 52 which inverts the supplied signal and supplies an inverted reference signal to data processing unit 51. Data processing unit 51 also receives a 3-bit data signal having the value $(111)_2$ supplied from bit-adding unit 53, and combines the 3 bits of data $(111)_2$ as the most significant bits to the 11-bit output of inverter 52 to produce a 14-bit data value. Data processing unit 51 adds the 14-bit data value to the 14-bit DRB signal and provides an additional most significant bit to the result thereof to produce a 15-bit error signal DER. The 15-bit error signal DER is supplied to data trimming unit 54 and the 8 most significant bits of error signal DER are supplied to exclusive-NOR gate 55 (also referred to herein as EX-NOR gate 55) which produces therefrom a data value that represents the absolute value of the supplied 8-bit signal. That is, EX-NOR gate 55 exclusively logically sums the most significant bit (i.e., the sign bit) and the remaining 7 bits and the result thereof is inverted so as to produce absolute value data signal ABR. The 7-bit absolute value signal ABR is supplied to both coarse adjustment modes switching circuit 56 and fine adjustment mode switching circuit 57, and the two highest order bits of signal ABR are supplied to AND gate 58. AND gate 58 operates to determine whether the CCD image sensors have imaged an irradiated flash (e.g., from a flash bulb of the camera), such flash resulting in signal ABR having a very high value with its two most significant bits having the value $(11)_2$. In such case, AND gate 58 produces a flash detection signal HUR having the value 1, otherwise, flash detection signal has the value zero. Signal HUR is supplied as an output from error detecting unit 50R and supplied to detection operation control unit 90 shown in FIG. 2.

Detection operation control unit 90 generates a 9-bit mode switching condition signal MD (to be discussed) and supplies signal MD to error detecting unit 50R. The most significant bit of signal MD is an adjustment mode setting bit which is provided to adjust control signal generating unit 70R in a manner to be discussed and which is supplied to selector 59 in error detecting unit 50R. The next four most significant bits of signal MD are supplied to coarse adjustment mode switching circuit 56 and the four least significant bits of signal MD are supplied to fine adjustment mode switching circuit 57.

Figure 6:
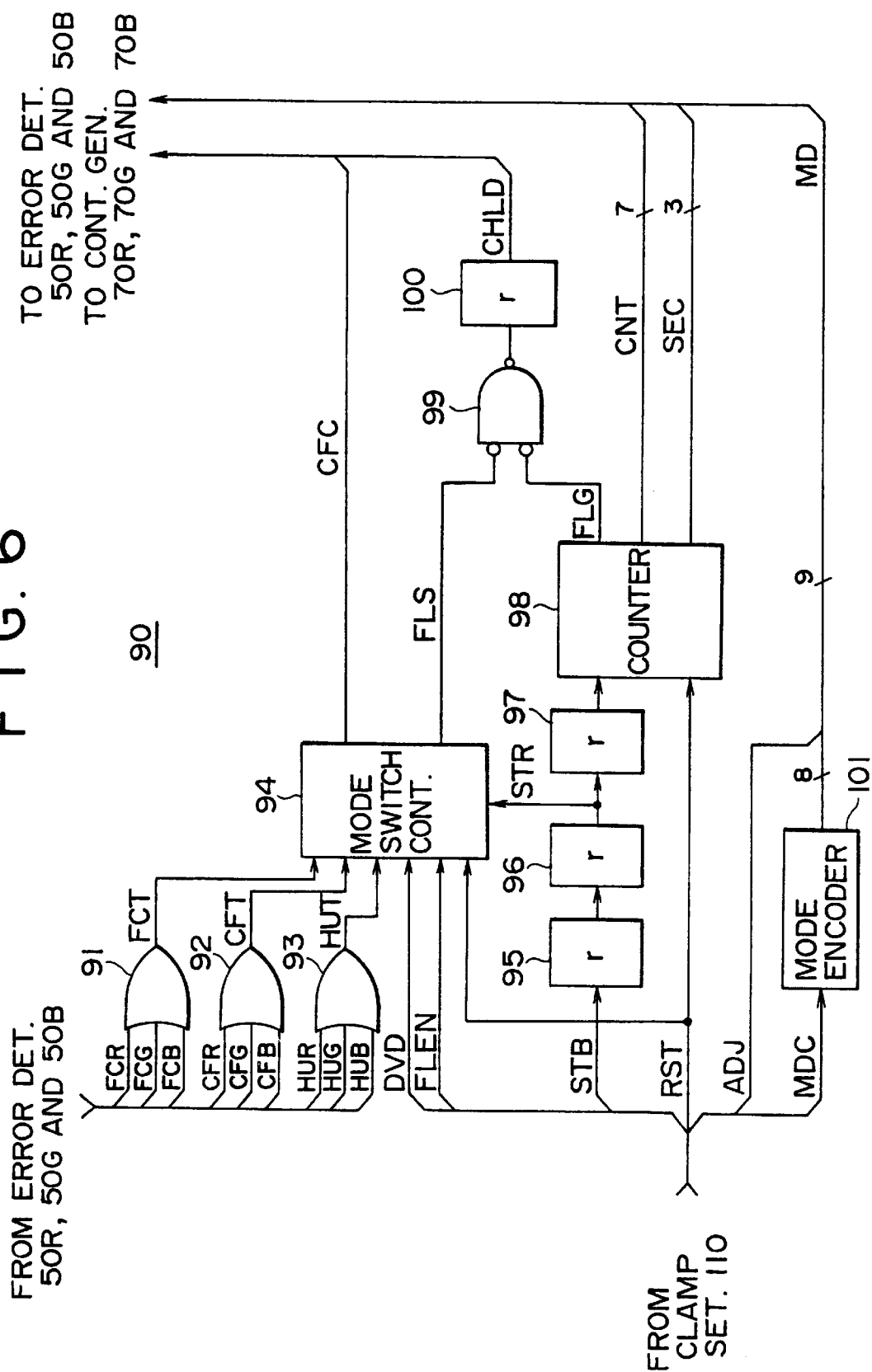
FIG. 6 is a block diagram of detection-operation control unit 90 shown in FIG. 2 in accordance with the present invention.

Referring to FIG. 6, a block diagram of detection operation control unit 90 is shown. Clamp operation setting unit 110 (FIG. 2) generates a 4-bit mode control signal MDC in a manner to be discussed and supplies signal MDC to a mode encoder unit 101 in detection operation control unit 90. The 4-bit MDC signal is converted in accordance with the table shown in FIG. 7 in mode encoder unit 101 to produce an 8-bit mode switching condition signal MD which, as previously mentioned, is supplied to error detecting unit 50R (FIG. 5). Referring to FIG. 7, a mode control signal MDC with a value of $(0)_{16}$ produces a mode switching condition signal MD of $(00000000)_2$, a mode control signal MDC with a value of $(E)_{16}$ produces a signal MD with the value $(11111111)_2$. Also, the mode control signal with a value of $(F)_{16}$ produces a signal MD with the value $(11111111)_2$. In addition, an adjustment bit ADJ supplied from clamp operation setting unit 110 (to be discussed) is appended to mode switching condition signal MD as the most significant bit thereof in order to produce the 9-bit mode-switching condition signal MD. In accordance with the present invention, clamp unit 20 switches between a coarse adjustment mode and a fine adjustment mode in order to properly clamp the video signal. The switching between the two adjustment modes is determined from the respective outputs of coarse adjustment mode switching circuit 56 and fine adjustment mode switching circuit 57 in a manner to be discussed.

Figure 8:
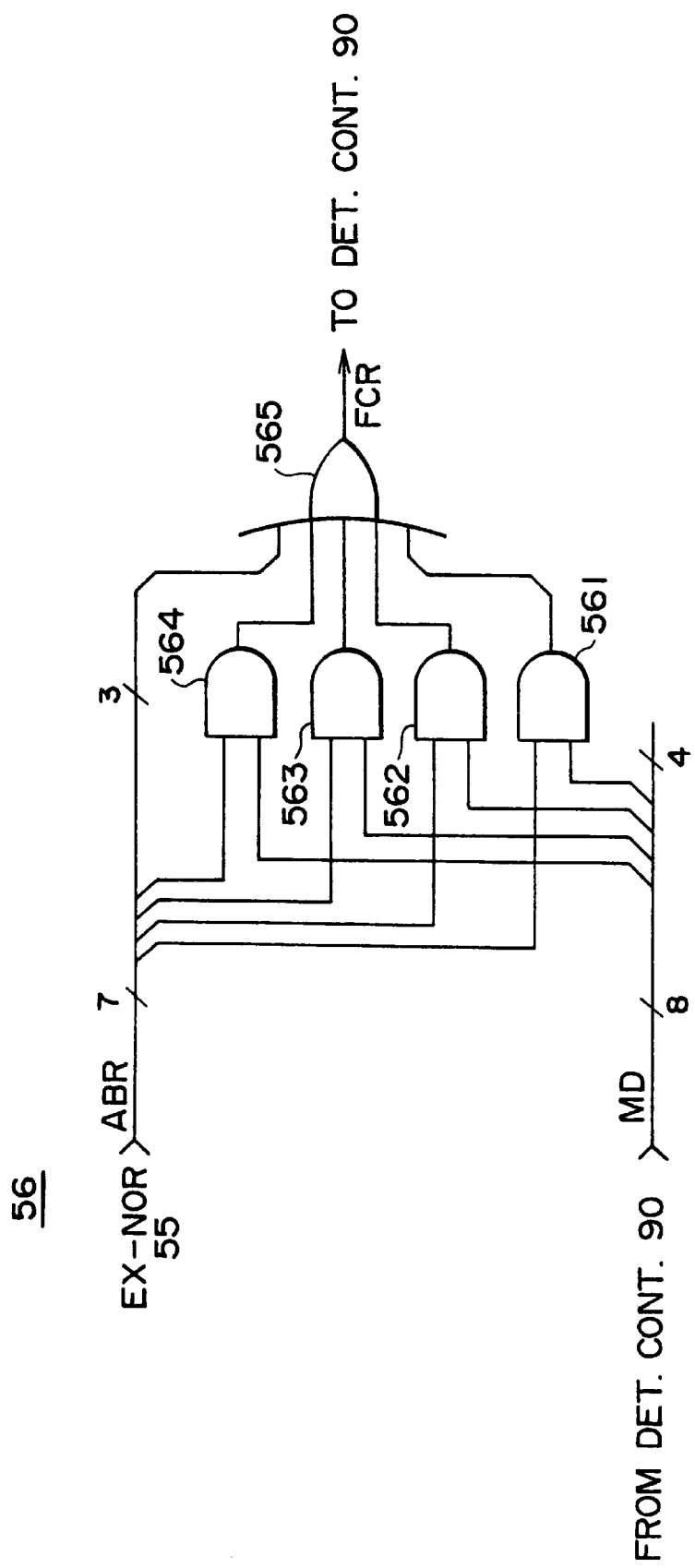
FIG. 8 is a block diagram of coarse adjustment mode switching circuit 56 shown in FIG. 5 in accordance with the present invention.

FIG. 8 is a block diagram of coarse adjustment mode switching circuit 56. As shown, coarse adjustment mode switching circuit 56 is comprised of 4 AND gates 561, 562, 563 and 564 and an OR gate 565. The four least significant bits of absolute value data signal ABR output from EX-NOR gate 55 (FIG. 5) are supplied to the four AND gates 561–564, the least significant bit being supplied to AND gate 561 and the most significant bit being supplied to AND gate 564, and the three most significant bits of signal ABR are supplied to OR gate 565. Further, the four most significant bits of mode-switching condition signal MD supplied from detection operation control unit 90 (FIG. 6) are supplied to AND gates 561–564, the least significant bit thereof being supplied to AND gate 561 and the most significant bit being supplied to AND gate 564. Thus, AND gates 561–564 output the logical products of the four least significant bits of signal ABR and the four most significant bits of signal MD, and the four outputs thereof are supplied to OR gate 565. OR gate 565 then outputs the logical sum of the three most significant bits of signal ABR and the respective outputs of AND gates 561–564 to produce coarse adjustment mode switching signal FCR (hereinafter, coarse signal FCR).

Fine adjustment mode switching circuit 57, shown in FIG. 5, has the same block structure as coarse adjustment mode switching circuit 56 shown in FIG. 8. However, and as previously mentioned, the four least significant bits of signal MD are supplied to fine adjustment mode switching circuit 57 and thus the AND gates therein produce logical products of the four least significant bits of signal ABR and the four least significant bits of signal MD, and the OR gate therein produces the logical sum of the outputs of the four AND gates and the three most significant bits of signal ABR to produce a fine adjustment mode switching signal CFR (hereinafter, fine signal CFR).

Figure 9:
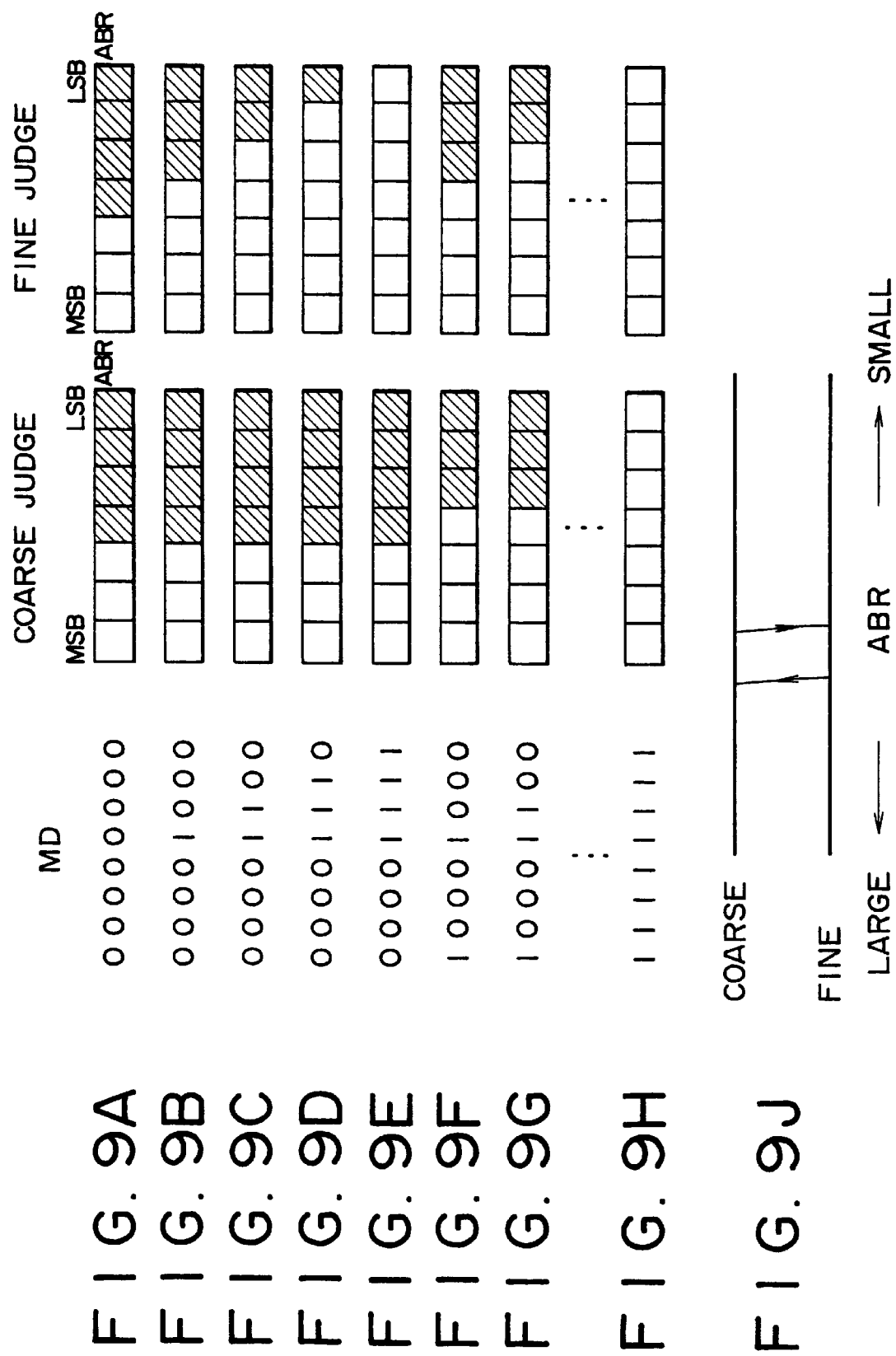
FIGS. 9A to 9J are useful for explaining the operation of coarse adjustment mode switching circuit 56 and fine adjustment mode switching circuit 57.

Referring to FIGS. 9A–9J, it is seen that when mode switching condition signal MD has the value $(00000000)_2$ (FIG. 9A), the four least significant bits of signal ABR are masked in coarse adjustment mode switching circuit 56 as well as in fine adjustment mode switching circuit 57, as represented by the hatched portions in the figure. Then, coarse signal FCR and fine signal CFR are generated from the remaining three most significant bits of signal ABR, as represented by the un-hatched portions. When signal MD has the value $(00001000)_2$, as shown in FIG. 9B, the four least significant bits of signal ABR are masked in coarse adjustment mode switching circuit 56, but only the three least significant bits of signal ABR are masked in fine adjustment mode switching circuit 57. Coarse signal FCR is generated from the three most significant bits of signal ABR and fine signal CFR is generated from the four most significant bits of signal ABR. As shown in FIGS. 9A–9G, the number of masked bits in signal ABR in fine adjustment mode switching circuit 57 is either equal to or smaller than the number of masked bits of signal ABR in coarse adjustment mode switching circuit 56. This relationship between the number of masked bits in the coarse and fine adjustment mode switching circuits 56 and 57 results in a hysteresis characteristic such as shown in FIG. 9J. Further, when one of the three most significant bits of signal ABR is high, the output of coarse adjustment mode switching circuit 57 (signal FCR) is high regardless of the values of signal MD (thus indicating that the coarse mode should be selected—to be discussed). On the other hand, when each of the three most significant bits of signal ABR is low and the outputs of the AND gates in fine adjustment mode switching circuit 57 all are low, signal CFR output by fine adjustment mode switching circuit 57 is low, thus indicating that a switch from the coarse adjustment mode to a fine adjustment mode is possible.

Referring back to FIG. 5, signals HUR, FCR and CFR output from AND gate 58, coarse adjustment mode switching circuit 56 and fine adjustment mode switching circuit 57, respectively, are supplied to OR gates 93, 91, and 92, respectively, in detection operation control unit 90 shown in FIG. 6. In addition, a green coarse adjustment mode switching signal FCG, a green fine adjustment mode switching signal CFG and a green flash detection signal HUG generated in error detecting unit 50G shown in FIG. 2 are supplied to OR gates 91, 92, 93, respectively, of detection operation control unit 90 and, similarly, a blue coarse adjustment mode switching signal FCB, a blue fine adjustment mode switch-ing signal CFB and a blue flash detection signal HUB generated in error detecting unit 50B (FIG. 2) are supplied to OR gates 91, 92 and 93, respectively. OR gates 91, 92 and 93 output to mode switching control unit 94 respective logical sums of the respective input signals, wherein OR gate 91 produces an RGB coarse adjustment mode switching signal FCT (hereinafter, coarse signal FCT), OR gate 92 generates an RGB fine adjustment mode switching signal CFT (hereinafter, fine signal CFT), and OR gate 93 generates an RGB flash detection signal HUT.

In addition, a vertical period signal DVD and a flash enable signal FLEN generated in clamp operation setting unit 110 (FIG. 2) are supplied to mode switching control unit 94. Vertical period signal DVD represents a pulse of a clock width that is generated once during each vertical scanning period of the supplied image signal, and the flash enable signal FLEN identifies whether or not "flash countermeasures" are to be taken (e.g., in a flash countermeasure mode), in which the clamping operation of the present invention is inhibited when the amount of light abruptly increases due to, for example, a flash or other substantially bright light source. Further, the clock represents a period of a clock signal CK of image pickup data signals DR, DG and DB.

A strobe signal STB generated in clamp operation setting unit 110 identifies the end of a "pixel zone" of the optical black level of the data signal and is supplied to register 95 in detection operation control unit 90 (FIG. 6). The output of register 95 is applied to register 96 which supplies the strobe signal as start signal STR to mode switching control unit 94 and also to register 97 which supplies the output thereof to a counter unit 98. Registers 95, 96 and 97 are driven by clock signal CK. A reset signal output from clamp operation setting unit 110, which indicates the resetting of the system to an initial state (e.g., during an initial power on), is supplied to mode switching control unit 94 and also to counter unit 98.

Figure 10:
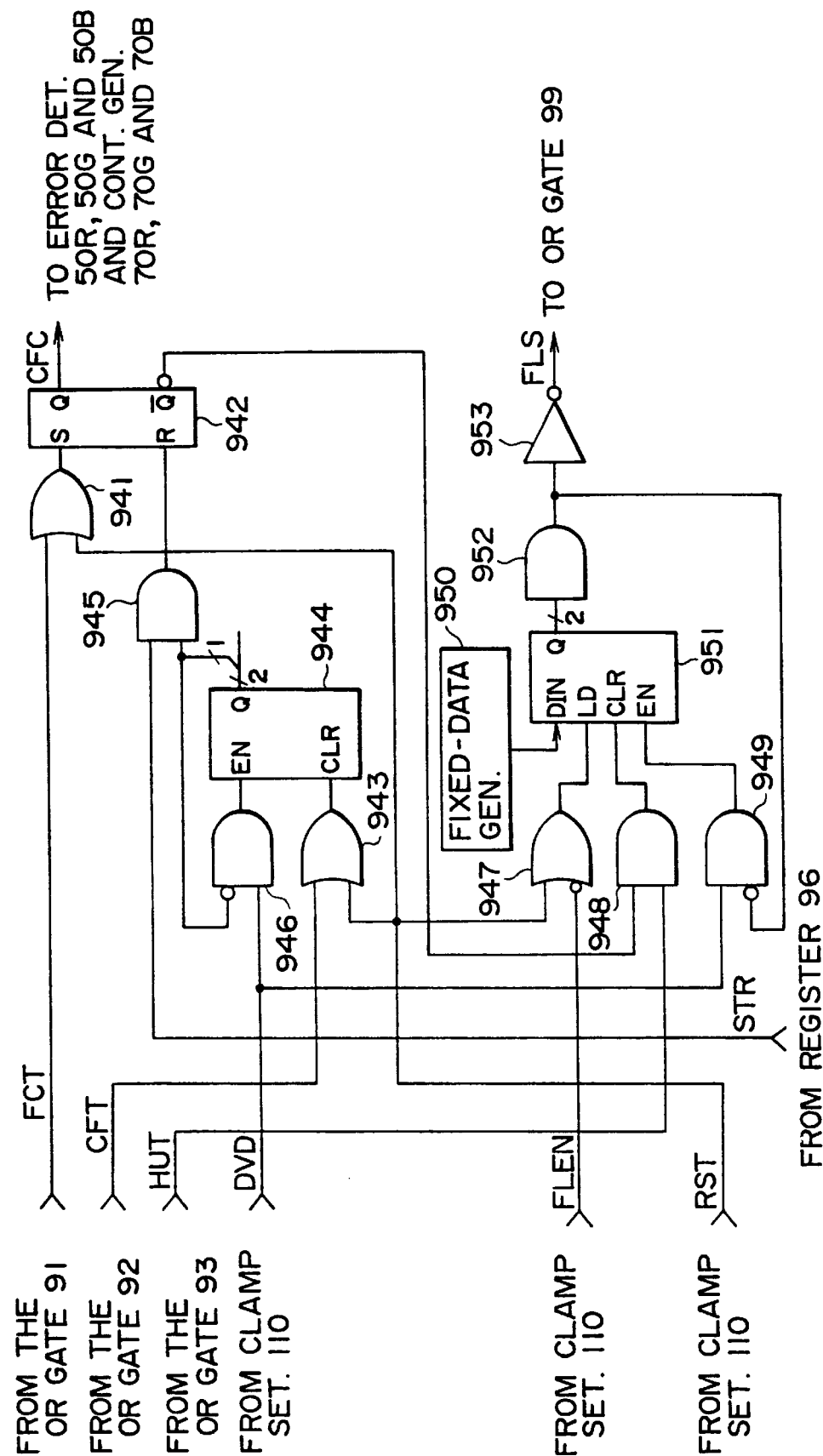
FIG. 10 is a block diagram of mode-switching control unit 94 shown in FIG. 6 in accordance with the present invention.

A block diagram of mode switching control unit 94 is shown in FIG. 10. As shown, coarse signal FCT (output from OR gate 91 in FIG. 6) is supplied to an OR gate 941, fine signal CFT (output from OR gate 92) is supplied to an OR gate 943, (to be discussed), and flash detection signal HUT (output from OR gate 93) is supplied to AND gate 948 (also to be discussed). Reset signal RST is supplied to OR gate 941 as well as to OR gate 943 and OR gate 947, and flash enable signal FLEN is supplied to OR gate 947.

OR gate 941 supplies the logical sum of the signals supplied thereto to the S (set) terminal of RS flip-flop 942. RS flip-flop 942 supplies a mode switching condition signal CFC at its output terminal Q which represents whether the coarse adjustment mode is selected or whether the fine adjustment mode is selected. Thus, when any one of coarse mode signals FCR, FCG and FCB generated in error detecting units 50R, 50G and 50B, respectively, have the value of 1, or when reset signal RST is set high to indicate a reset operation, mode switching condition signal CFC is set high indicating that the coarse adjustment mode is selected. Therefore, the coarse adjustment mode is selected initially (e.g., when the video camera is turned on), or when the above-described combination of absolute value signal ABR and mode switching condition signal MD is high.

In accordance with the present invention, after the coarse adjustment mode is selected, the fine adjustment mode is selected when fine signal CFT is low for a period of three fields. Fine signal CFT is supplied to OR gate 943, as previously mentioned, and reset signal RST also is supplied to OR gate 943 which supplies the logical sum thereof to the clear (CLR) terminal of a counter 944 which operates to determine whether three fields have occurred when fine signal CFT is low. Vertical period signal DVD is supplied to both AND gates 946 and 949, and the high bit of the 2-bit output of counter 944 (terminal Q) is supplied to an inverted input of AND gate 946, which supplies the logical product of the inverted Q value and signal DVD to the enable terminal of counter 944 thus enabling the counting therein at each high value of the supplied signal. Counter 944 is a 2-bit counter which counts from 0 to 3 and, thus, operates to supply an output Q of $(11)_2$ after three vertical periods of having the fine signal CFT being in its low state. The high bit of the output of counter 944 is supplied to AND gate 945, which also receives as an input the start signal STR output from register 96 (FIG. 6), and AND gate 945 outputs the logical product of its inputs to the reset (R) terminal of RS flip-flop 942. Thus, when counter 944 outputs the value $(11)_2$, the RS flip-flop 942 is reset when the strobe signal (i.e., start signal STR) is received and RS flip-flop 942 then supplies a mode switching signal CFC having a low value representing that the fine adjustment mode is selected. When counter 944 outputs the value $(11)_2$, the output of AND gate 946 is low thus disabling any further count of the counter so that it remains at the value $(11)_2$. Since the output of OR gate 943 is supplied to the clear terminal of counter 944, the counter 944 is reset to the value $(00)_2$ when fine signal CFT goes high (i.e., any one of fine signals CFR, CFG and CFB go high) or when the video camera is reset as indicated by reset signal RST.

As previously mentioned, when any one of coarse mode signals FCR, FCG and FCB is high, as represented by a high value of coarse signal FCT, mode switching signal CFC is set high by RS flip-flop 942 representing the selection of the coarse adjustment mode. Further, a reset of the system also serves to select the coarse adjustment mode by means of the supply of the reset signal RST to OR gate 941.

Flash detection signal HUT is applied to AND gate 948, and the inverted output of RS flip-flop 942 also is supplied to AND gate 948 which supplies the logical product thereof to the clear terminal of counter 951. The reset signal RST is supplied to OR gate 947 and flash enable signal FLEN is supplied to the inverted input of OR gate 947 which supplies the logical sum thereof to a load (LD) terminal of counter 951. Vertical period signal DVD is supplied to AND gate 949 and the output of AND gate 952 (to be discussed) is supplied to the inverted input of AND gate 949 which supplies the logical product thereof to the enable terminal of counter 951. Fixed data generating unit 950 supplies the signal $(11)_2$ to a data input (DIN) terminal of counter 951.

As will be understood, counter 951 in conjunction with AND gate 952, inverter 953, AND gates 948 and 949 and OR gate 947, operate to establish a flash signal FLS for a period of three vertical blanking periods when a flash is detected as indicated by signal HUT. The 2-bit counter of counter 951 is supplied to AND gate 952 which supplies the logical product of the two bits to inverter 953 which supplies an inverted value thereof as flash signal FLS. When the flash enable signal FLEN is low (i.e., reset) or the reset signal RST is high, the value supplied to terminal LD of counter 951 is high which causes the value output from fixed data generating unit 950 (i.e., $(11)_2$) to be supplied at output terminal Q of counter 951 which produces a low flash signal FLS. When the value supplied to terminal LD of counter 951 is low (i.e., flash enable signal FLEN is set high and reset signal RST is low), counter 951 is enabled to count by means of the signal supplied to its enable terminal or is reset by means of the high signal supplied to its clear terminal, wherein a selection of the fine adjustment mode produces an inverted Q output of counter 942 that is high, and a high value signal HUT (representing a flash) produces a high output of AND gate 948 thus clearing counter 951. A $(00)_2$ output of counter 951 then produces a flash signal FLS having a high value. In this state, AND gate 949 generates a high output at each vertical period as represented by signal DVD which enables the counting of counter 951 which produces an output of $(11)_2$ after three vertical scanning periods and, thus, flash signal FLS goes low after three vertical scanning periods after the occurrence of either a flash or a resetting of the video camera.

Mode switching condition signal CFC output from counter 942 is supplied to data trimming unit 54 in each of the error detecting units 50R, 50G and 50B (FIG. 5), and flash signal FLS is supplied to OR gate 99 in detection operation control unit 90 shown in FIG. 6.

Figure 11:
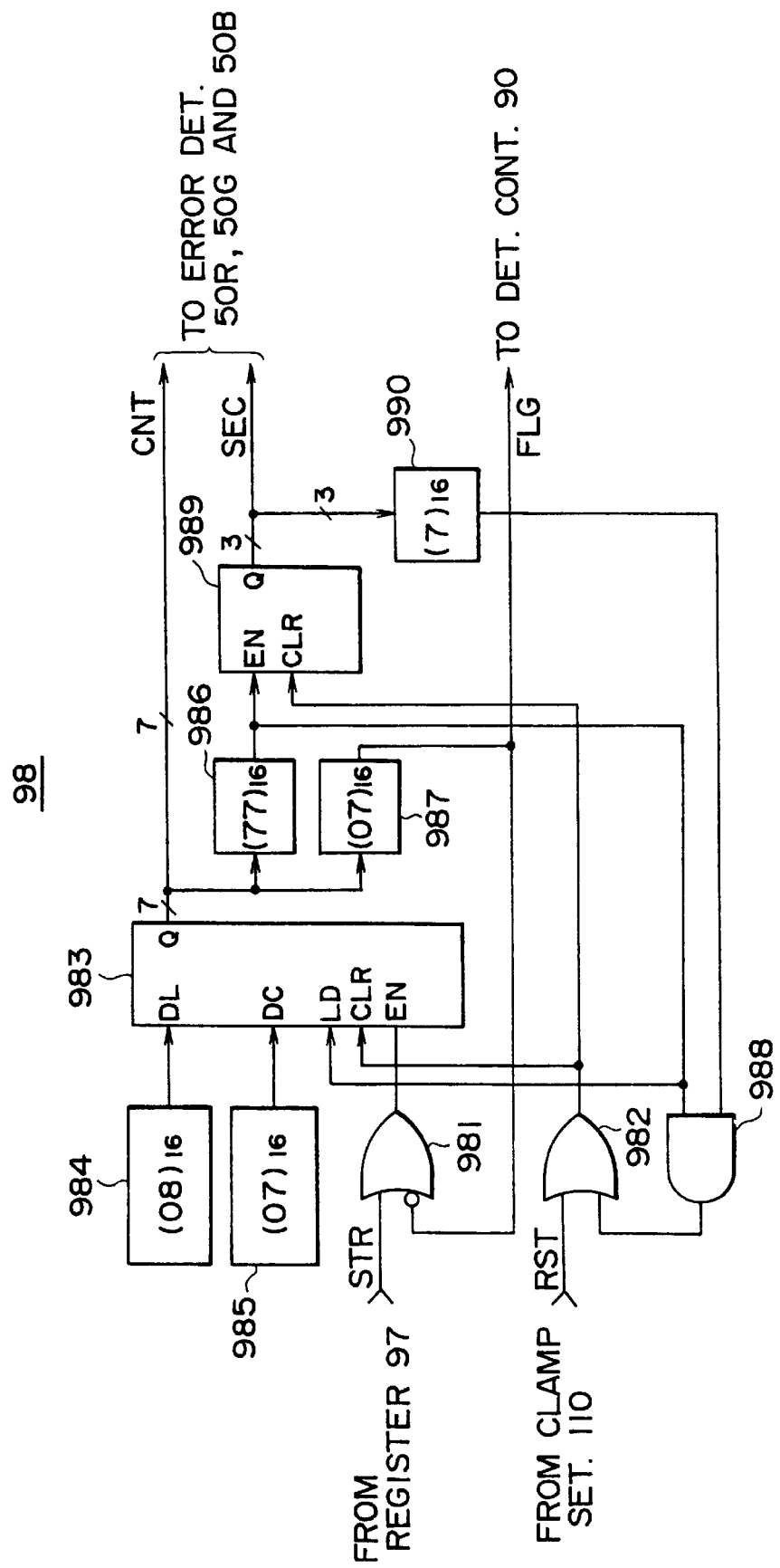
FIG. 11 is a block diagram of counter unit 98 shown in FIG. 6 in accordance with the present invention.

Referring next to FIG. 11, a block diagram of counter unit 98 as shown in detection operation control 90 of FIG. 6 is shown. The output of register 97 (FIG. 6) representing start signal STR is supplied to OR gate 981, and a flag signal FLG output by data control unit 987 (to be discussed) is supplied to an inverted input of OR gate 981, which supplies the logical sum thereof to an enable (EN) terminal of a counter 983. Reset signal RST output from clamp operation setting unit 110 is supplied to an OR gate 982, and the output of an AND gate 988 (to be discussed) also is supplied to OR gate 982 which supplies the logical sum thereof to clear terminals of counters 983 and 989.

A fixed data generating unit 984 supplies the value $(08)_{16}$ to a data load (DL) terminal of counter 983 and a fixed data generating unit 985 supplies the value $(07)_{16}$ to a data clear (DC) terminal of counter 983. The output Q of counter 983 is supplied as a count signal CNT to error detecting units 50R, 50G and 50B, and also is supplied to data comparing units 986 and 987 which compare the output value Q with respective data values therein. Specifically, data comparing unit 986 compares the output Q to the value $(77)_{16}$ and supplies a high output to an enable terminal of counter 989 when the two values are the same and supplies a low value when the two values are not the same. Similarly, data comparing unit 987 compares the output Q of counter 983 with the value $(07)_{16}$ and supplies a high output to an inverted input terminal of OR gate 981 when the two values are the same and supplies a low output when the two values are not the same. The output of data comparing unit 987 also is supplied as flag signal FLG to detection operation control unit 90 (FIG. 6), previously mentioned. 3-Bit counter 989 supplies a 3-bit output value at terminal Q as count signal SEC to error detecting units 50R, 50G and 50B, as well as to a data comparing unit 990 which compares the supplied value with the value $(7)_{16}$ and generates a high output which is supplied to AND gate 988 when the comparison is the same and generates a low output when the two values are not the same.

Referring back to FIG. 1, CCD image sensors 10R, 10G and 10B each have a horizontal direction pixel amount corresponding to 908 clock periods, wherein an error that is detected by twelve clock periods represents the difference between the image data signal of the pixel zone at the optical black level and a reference signal RF, and in accordance with the present invention, linear feedback clamping is carried out in the remaining 896 clock periods, resulting in a relatively low basic frequency of the linear feedback clamping operation thereby producing substantially beneficial results. In the 896 clock periods, the level of the image data signal is controlled eight times so that the basic frequency of the linear feedback clamp processing appears high. Clamp control of the image data signal level therefore occurs within 112 clock periods and the stored numbers in fixed data generating units 984 and 985 correspond to the appropriate amounts in order to control counter 983 to count the number of clock periods up to 112 periods, and that counter 989 is controlled to count the number of times counter 983 reaches 112 which should occur 8 times.

When a reset occurs, as indicated by reset signal RST, or when the output of comparator 986 is high (indicating that the output of counter 983 has the value set $(77)_{16}$) and when the output of data comparing unit 990 is high, counter 983 is reset. At this time, the data supplied by fixed generating unit 985, i.e., $(07)_{16}$, is supplied as an output from counter 983. Since data comparing unit 987 compares the data output from counter 983 to the value $(07)_{16}$, which has the same value as supplied from circuit 985, the flag signal FLG output from data comparing unit 987 is set high when counter 983 is cleared, i.e., is set to the value supplied to terminal DC. Also upon reset, comparator 986 supplies a low output (since signal CNT does not equal the value $(77)_{16}$) to the 8-bit counter 989 and also to AND gate 988. Thus, AND gate 988 supplies a low value to OR gate 982 which then supplies a low value as an output to the respective clear terminals of counters 983 and 989.

When start signal STR is set high, counter 983 is enabled to count the number of pulses in a clock signal CK (not shown) thus producing an output count (i.e., signal CNT) that increments from the value $(07)_{16}$ to the value $(08)_{16}$, at which time, comparator 987 supplies a flag signal FLG having a low value, since the output of counter 983 does not equal $(07)_{16}$, which causes OR gate 981 to supply a high value to the enable terminal of counter 983 enabling the counter to further increment the count value therein. The output of counter 983 sequentially increments to the value $(77)_{16}$, or until comparator 986 supplies a high output (supplied to the LD terminal of counter 983) thus causing 983 to load the count value therein as the value $(08)_{16}$ output from fixed data generating unit 984. Also, a high output of comparator 986 causes counter 989 to increment the value therein by one, but the output of comparator 990 remains low until counter 989 outputs signal SEC with the value $(7)_{16}$. In the meantime, counter 983 is controlled to provide a count output (signal CNT) that increments between the values $(08)_{16}$ and $(77)_{16}$ eight times. After the eighth time, counter 989 supplies the count value $(07)_{16}$ as signal SEC and comparator 990 supplies a high output to AND gate 988, and since counter 983 has reached the value $(77)_{16}$, comparator 986 supplies a high value to AND gate 988, which then operates, via OR gate 982, to reset counters 983 and 989. The flag signal output from comparator 987 is then set high.

FIGS. 12A–12C illustrate the data structure of signal CNT, signal SEC and the flag signal FLG, wherein it is seen that count signal CNT counts between the values $(08)_{16}$ and $(77)_{16}$ eight times, signal SEC provides a count value between 0 and 7 during this time, and the flag signal FLG is set low during this time.

Flag signal FLG is supplied to OR gate 99 of operation control unit 90 shown in FIG. 6. Referring back to FIG. 6, flash signal FLS output from mode switching control unit 94 is also supplied to OR gate 99 which provides the logical sum of the supplied inputs via register 100 as a hold signal CHLD to control signal generating units 70R, 70G and 70B (to be discussed). As seen from the foregoing discussion, hold signal CHLD is set high when counter 983 is not carrying on the sequential counting operation or when a flash has occurred, as indicated by flash signal FLS.

Figure 13:
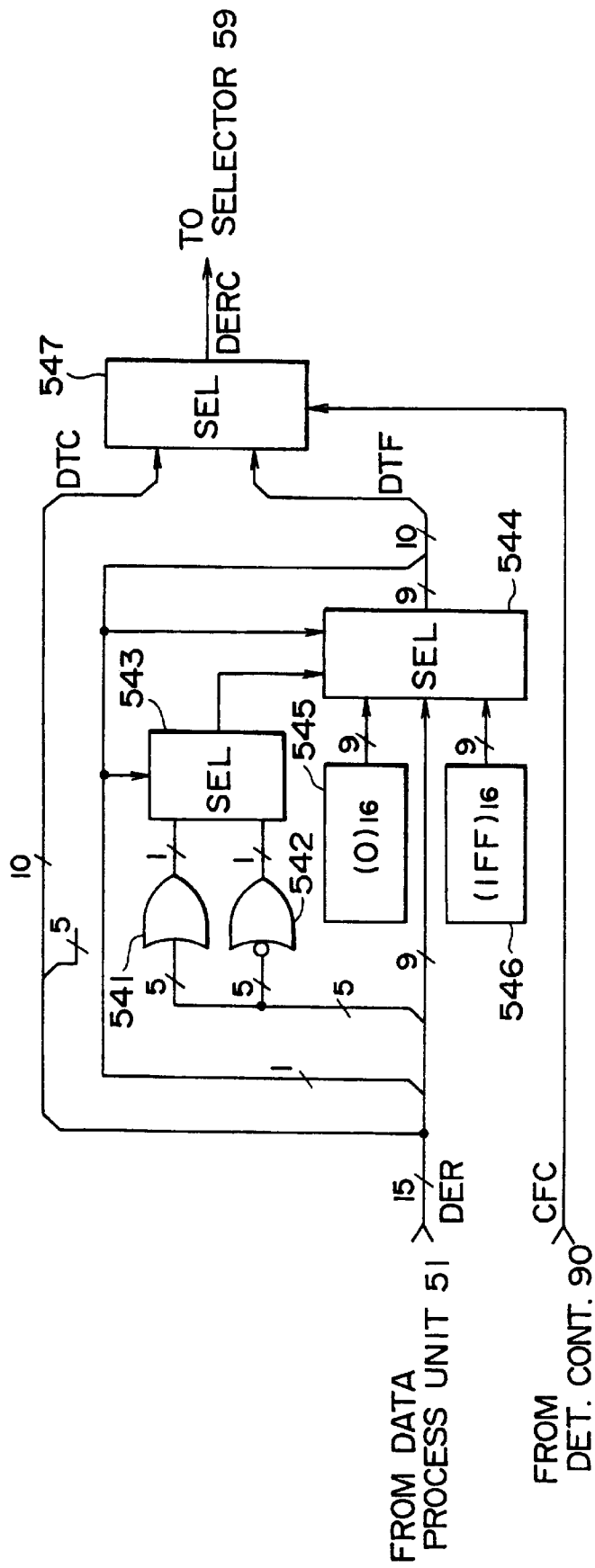
FIG. 13 is a block diagram of data-trimming unit 54 shown in FIG. 5 in accordance with the present invention.

Referring back to FIG. 5, error signal DER is supplied to data trimming unit 54 which extracts therefrom ten of the fifteen bits in accordance with the mode switching condition signal CFC supplied from detection operation control unit 90 (FIG. 6). FIG. 13 is a block diagram of data trimming unit 54, in which the ten most significant bits of error signal DER are supplied to a selector 547 as signal DTC, the most significant bit of error signal DER is supplied to selectors 543 and 544, the second through sixth most significant bits of error signal DER are supplied to OR gate 541 and NAND gate 542, and the nine least significant bits of error signal DER are supplied to selector 544. Referring to FIGS. 14A–14E of FIG. 14, as well as to FIG. 13, it is seen that various signals are selected depending on the value of the most significant bit (i.e., the sign bit) of error signal DER. The second through sixth most significant bits (i.e., bits D13-D9) of signal DER are logically summed in OR gate 541 which produces a high output if any of the supplied bits are high. Conversely, bits D13-D9 are inverted and then summed in NAND gate 542 and supplies a high output if any of the supplied bits are low. The outputs of gates 541 and 542 are supplied to selector 543 which selects one of the supplied values depending on the value of the most significant bit (the sign bit) of signal DER, and the selected input signal is supplied to selector 544.

Also supplied to selector 544 is the value $(0)_{16}$ generated by fixed data generating unit 545, and the value $(1FF)_{16}$ generated by fixed data generating unit 546. The most significant bit of signal DER also is supplied to selector 544 which selects one of the three 9-bit values supplied thereto depending on the values of the signal supplied from selector 543 and the most significant bit of signal DER. As shown in FIGS. 14A–14C, the nine least significant bits (D8-D0) of signal DER are selected by selector 544 when the sign bit of signal DER is low and the output of NAND gate 542 is low (i.e., bits D9–D13 all are high), the value $(0)_{16}$ is selected when the sign bit of signal DER is low and the output of NAND gate 542 is high, bits D0–D8 of signal DER are selected when the sign bit of signal DER is high and the output of OR gate 541 is low (i.e., bits D9–D13 all are low), and the value $(111111111)_2$ is selected when the sign bit of signal DER is high and the output of OR gate 541 is high.

The sign bit is appended to the selected nine bits, as shown in FIG. 14D, to produce signal DTF which is supplied to selector 547. Selector 547 selects for output thereof signal DTC (the ten most significant bits of signal DER) when mode selection signal CFC is high, and selects signal DTF when mode selection signal CFC is low. The selected signal is supplied as control error signal DERC to selector 59, shown in FIG. 5. FIG. 14E illustrates signal DTC as comprising the ten most significant bits of error signal DER.

Referring again to FIG. 5, a fixed data generating unit 60 supplies a signal having the value $(200)_{16}$ to selector 59 in an adjustment mode to indicate that the error is zero. The most significant bit of mode switching condition signal MD also is supplied to selector 59 and, as previously discussed, the most significant bit of signal MD indicates whether or not the adjustment mode is selected. During selection of the adjustment mode, as indicated by the one bit of signal MD, selector 59 selects for output thereof the value $(200)_{16}$ supplied from circuit 60, but when the adjustment mode is not selected, selector 59 selects signal DERC supplied from data trimming unit 54.

The seven most significant bits of the 10-bit selected signal are supplied to comparator unit 61 and the three least significant bits of the supplied signal are supplied to bit adjusting unit 62. As will be understood, and also as previously mentioned, the three least significant bits supplied to circuit 62 represent fractional components (refer to FIG. 3C). Count signal CNT output from counter unit 98 in detection operation control unit 90 is supplied to comparator 61 and count signal SEC supplied from counter unit 98 is supplied to bit adjustment unit 62.

Comparator 61 compares the seven most significant bits supplied from selector 59 to count signal CNT (FIG. 12), and supplies a high output when the data supplied from selector 59 is greater than signal CNT, but supplies a low output when the supplied value is less than signal CNT. The output of comparator 61 is supplied to register 64 and OR gate 63, and the output of register 64 is supplied to AND gate 65.

In the fine adjustment mode, the adjustment data signal is set to the value $(200)_{16}$ to indicate a zero error, wherein the integer portion of the signal has the value $(40)_{16}$ since the three least significant bits of this signal represent fractional components thereof. Thus, in this mode, comparator 61 supplies a high output from the first through fifty-sixth count of signal CNT and supplies a low output thereafter. Hence, comparator 61 supplies a high output for the same period of time it supplies a low output for zero error.

Figure 15:
FIG. 15 is a diagram useful for explaining the generation of additional signal PUL in bit adjusting unit 62 shown in FIG. 5.

Bit adjusting unit 62 generates a signal PUL from the supplied three least significant bits of the output of selector 59 and the 3-bit signal SEC in accordance with the Table shown in FIG. 15. For example, when the three least significant bits of the output of selector 59 (hereinafter, signal RES) have the value $(03)_{16}$, the 1-bit signal PUL is set high when signal SEC has the values $(0)_{16}$, $(2)_{16}$ or $(5)_{16}$, and signal PUL is set low for other values of signal SEC. Signal PUL is supplied to AND gate 65 which outputs the logical product of the supplied inputs to OR gate 63 which logically sums the output of AND gate 65 and the output of comparator unit 61 and supplies the result thereof via register 66 as a pulse width modulated signal PWMR that is supplied to control signal generating unit 70R (to be discussed). Registers 64 and 66 are driven by clock signal CK (not shown) and when signal PUL is set high, the period in which the output of comparator unit 61 is set high represents one clock period thus generating the pulse width modulated signal PWMR.

When the fine adjustment mode is selected and data signal DTF is selected to be output as signal DERC in selector 59 (FIG. 13), the three least significant bits of signal DTF constitute the fraction portion thereof and signal PUL when set to the high state results in eight generations of the pulse width modulated signal PWMR. Thus, the fractional portion of the data is utilized effectively by means of pulse width modulated signal PWMR being at the logic level 1.

Figure 16:
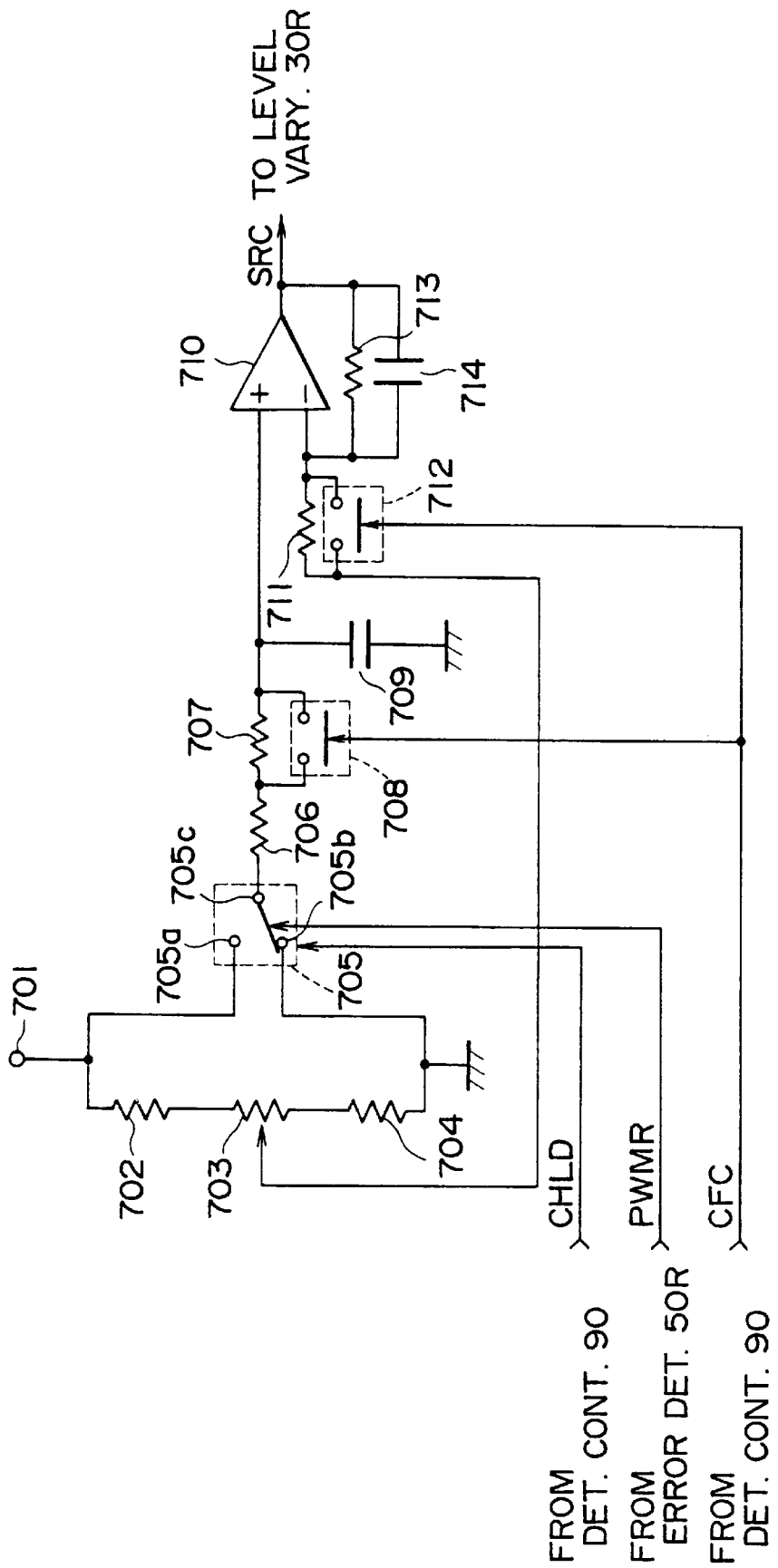
FIG. 16 is a block diagram of control signal generating unit 70R shown in FIG. 2.

Pulse width modulated signal PWMR is supplied to control signal generating unit 70R (FIG. 2) which has the block diagram as shown in FIG. 16. Signal PWMR is supplied to a switch 705 to control the switching thereof. Switch 705 includes a terminal 705a which is coupled to a power source via terminal 701, a terminal 705b that is coupled to ground, and a moveable terminal 705c that is coupled to a non-inverting input of an operational amplifier 710 via resistors 706 and 707. A switch 708 is coupled in parallel to resistor 707, and a capacitor 709 is connected between the non-inverting terminal of operational amplifier (op-amp) 710 and ground. A resistor 702, a variable resistor 703 and another resistor 704 are serially coupled between the power source of terminal 701 and ground, and a "needle" of variable resistor 703 is coupled to a parallel circuit formed of a resistor 711 and a switch 712, the other end of the parallel circuit being coupled to the inverted input terminal of op-amp 710. A parallel circuit comprised of a resistor 713 and a capacitor 714 is coupled between the inverted input terminal of op-amp 710 and the output terminal of op-amp 710. Finally, mode selection signal CFC is coupled to switches 708 and 712 so as to control the switching thereof and a hold signal CHLD output from detection operation control unit 90 (FIG. 6) is coupled to switch 705 and operates to control switch 705 to place it in a high-impedance state.

The output of op-amp 710 is supplied as control signal SRC to level varying unit 30R (FIG. 2) which, as previously discussed, varies the level of red image signal SR accordingly. In accordance with the present invention, control signal SRC is generated without a "drift" by op-amp 710 when an error in error detecting unit 50R (FIG. 5) is fixed. To provide a constant control signal SRC, pulse width modulated signal PWMR, which has a duty cycle of 50% for a zero error, is supplied as a fixed voltage to the non-inverting terminal of op-amp 710, and supplying a variable voltage, varied by variable resistor 703, to the inverting input terminal of op-amp 710, in order to produce a constant signal (signal SRC) with no drifts and with no steady state deviation.

As previously mentioned, error detecting unit 50R produces an error signal DERC that is comprised of the ten most significant bits of signal DER in the coarse adjustment mode (FIGS. 13, 14) and supplies signal DERC which is comprised of the sign bit (the most significant bit) and possibly the nine least significant bits of signal DER. It follows, then, that the gain in the coarse adjustment mode is thirty-two times that of the fine adjustment mode, and given an open-loop gain change by as much as thirty-two times, it is difficult to provide a stable system because the response characteristic of the system substantially changes. Thus, the above-discussed gain switching (FIG. 16) is provided in control signal generating unit 70R.

Figure 17:
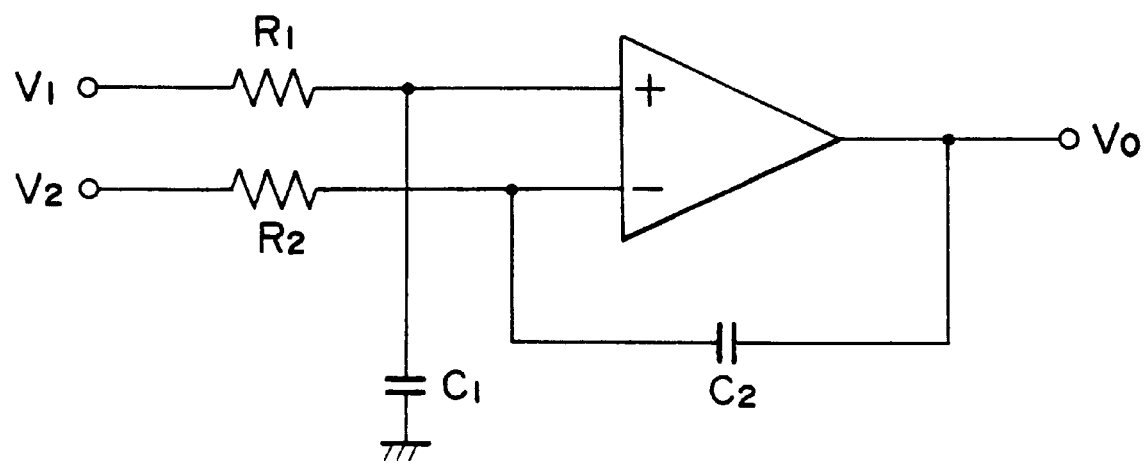
FIG. 17 is a schematic illustration of an integrating circuit.

Referring again to FIG. 16, the resistance values of each of the resistors and the capacitance values of each of the capacitors in control signal generating unit 70R are selected with reference to the block diagram of FIG. 17. Referring to FIG. 17, given the illustrated circuit and the resistors having the resistance values R1 and R2, and the capacitors having the capacitance values C1 and C2, the alternating-current transfer characteristic of the integrator shown in FIG. 17 is expressed by equation 1, wherein voltage $v_2$ corresponds to the variable voltage supplied from variable resistor 703.

$$V_0 = \left\{ \frac{1 + jwC_2R_2}{1 + jwC_1R_1} v_1 - v_2 \right\} \frac{1}{jwC_2R_2} \quad (1)$$

When zero is substituted for voltage v2 in equation 1, since this voltage is a direct current (DC) voltage, the alternating current transfer characteristic is represented by equation 2.

$$V_0 = \frac{1 + jwC_2R_2}{jwC_2R_2(1 + jwC_1R_1)} v_1 \quad (2)$$

When the condition shown in equation 3 is satisfied, the gain derived from equation 1 is unity.

$$W = \frac{1}{\sqrt{C_1 R_1 C_2 R_2}} \quad (3)$$

To provide good reliability and to allow the effects of ripples to be eliminated, R1, R2, C1 and C2 are set to satisfy the condition shown in equation 4.

$$\frac{1}{C_2 R_2} = \frac{1}{C_1 R_1} \quad (4)$$

Combining equations 2 and 4 then results in the characteristic equation shown in equation 5, wherein C=C1=C2 and R=R1=R2.

$$v_0 = \frac{1}{CR} v_1 \quad (5)$$

Still further, the pulse width modulated signal PWMR is generated at a frequency eight times that of the horizontal scanning frequency $f_H$ and, thus, $w=2\ \text{pi}\times 8f_H$.

Furthermore, the red image data signal DR output from A/D converter 35R (FIG. 2) is twelve bits long and is a (2, 8, 2) bit signal. Then, by setting the amplitude at $1/(2)^{12}$, the ripple is suppressed to one digit or less and, using equation 6, the values of C and R are established so as to satisfy equation 7.

$$\frac{1}{4096} = \frac{1}{2\pi \cdot 8 f_H \cdot CR} \quad (6)$$

$$\frac{1}{CR} = 193 \quad (7)$$

Since switch 705, shown in FIG. 16, is controlled by pulse width modulated signal PWMR, and the duty cycle of signal PWMR is varied in accordance with error signal DER which represents the difference between reference signal RF and average value signal DRB, the voltage supplied to non-inverting terminal of op-amp 710 varies in accordance with this error, that is, it varies in accordance with the difference between the reference signal RF and the average value signal DRB.

As previously discussed, pulse width modulated signal PWMR is generated in the coarse adjustment mode by utilizing the nine most significant bits of error signal DER (without the sign bit) and is generated in the fine adjustment mode from the nine least significant bits of error signal DER. Thus, the gain in the coarse adjustment mode is thirty-two times the gain in the fine adjustment mode.

Referring again to FIG. 16, when switching condition signal CFC is set low, indicating the fine adjustment mode, switches 708 and 712 are off (i.e., not short circuiting resistors 707 and 711, respectively). However, when signal CFC is set high, indicating the coarse adjustment mode, switches 708 and 712 are "depressed" (electrically) thus short circuiting resistors 707 and 711, respectively. Such short circuiting thus results in an increase in gain by an amount of thirty-two times that of the fine adjustment mode.

As previously mentioned, op-amp 710 supplies control signal SRC to level varying unit 30R (FIG. 2), and since this signal is varied continuously in accordance with the error between reference signal RF and average value signal DRB, the level of the red image signal SR is controlled appropriately thus clamping the data signal DR to a predetermined signal level.

Still further, switch 705 (FIG. 16) is set into a high impedance state by means of hold signal CHLD resulting from excessive light caused by, for example, a flash. In this instance, the voltage supplied to non-inverting terminal of op-amp 710 is sustained keeping control signal SRC at a fixed level. Then, upon occurrence of three vertical scanning periods, the level of control signal SRC is varied in accordance with pulse width modulated signal PWMR thus producing the high quality image immediately after a relatively short amount of time after the flash. As previously mentioned, the green image signal SG and the blue image signal SB are processed in an identical manner to that of the red image signal SR and, thus, the descriptions of processing the green and blue image signals are omitted herein.

In accordance with the present invention, error detecting units 50R, 50G and 50B, as previously discussed, obtains respective error signals that are derived from reference signal RF and the average value signal DRB for a pixel element zone at the optical black level, in which fractional components thereof are obtained in level detecting units 40R, 40G and 40B. The average value signal DRB is made equal to reference signal RF (including the fractional components) thus allowing a resultant smaller error utilizing the fractional component. Using the above-described technique, the prior art problem of oscillations due to fluctuations of the least significant bits is overcome. The present invention further provides for the generation of a pulse width modulation signal from an error signal that represents the difference between the average value signal and the reference signal, controlling the image pickup signals SR, SG and SB during the video period in the manner discussed above so that linear feedback clamping may be carried out using a clamp unit having relatively few input terminals (i.e., pins). Also, since the pulse width modulated signal is generated eight times during each video period, the basic frequency of the linear feedback clamp processing appears high and, as a result, adverse effects of linear feedback clamping are not shown when the video image is displayed on a monitor. Still further, the above-described clamping circuit provides a convergence at an accuracy that is equal to or better than the least significant bit of each of the image data signals output from the respective A/D converters.

The present invention also provides for the switching between a coarse adjustment mode and a fine adjustment mode, wherein a hysteresis characteristic is provided. Also provided is the switching from the fine adjustment mode to the coarse adjustment mode in the event of the occurrence of excessive light due to, for example, a flash. In such case, the previous state of control signal generating unit 70R (FIG. 6) is maintained for a predetermined period of time after the flash thus preventing the linear feedback clamp processing operation from greatly fluctuating. This provides a high quality image immediately after the completion of the excessive light.

While the present invention has been particularly shown and described in conjunction with preferred embodiments thereof, it will be readily appreciated by those of ordinary skill in the art that various changes may be made without departing from the spirit and scope of the invention. For example, although the clamp unit 20 of the present invention has been described as clamping image signals output from CCD image sensors, the present invention is not limited solely thereto and may be applicable for use with other clamping operations, including, clamping a video signal.

Therefore, it is intended that the appended claims be interpreted as including the embodiments described herein, the alternatives mentioned above, and all equivalents thereto.

What is claimed is:

1. Apparatus for clamping an image signal, said apparatus being operable in a coarse adjustment mode and a fine adjustment mode, comprising:

means for receiving an analog image signal having a plurality of periods, each of said periods including a reference zone;

means for varying a level of said reference zone in said analog image signal in accordance with an analog control signal to produce a varied analog image signal;

means for converting the varied analog image signal to a digital image signal;

means for generating a digital zone value signal corresponding to a level of said digital image signal in the reference zone; and control means for digitally detecting an amount of error between said digital zone value signal and a predetermined zone value and generating a digital error signal having a predetermined number of data bits from the detected amount of error; for switching between said coarse adjustment mode and said fine adjustment mode in accordance with a level of said digital error signal; and for generating said analog control signal, in said coarse adjustment mode, from most significant ones of said data bits of the digital error signal, and generating said analog control signal, in said fine adjustment mode, from least significant ones of said data bits of the digital error signal.

2. The apparatus of claim 1, wherein said control means is operable to switch from said coarse adjustment mode to said fine adjustment mode when said digital error signal is less than a first predetermined signal level, and to switch from said fine adjustment mode to said coarse adjustment mode when said digital error signal is greater than a second predetermined signal level, said second predetermined signal level being greater than or equal to said first predetermined signal level to produce a hysteresis effect.

3. The apparatus of claim 2, wherein said control means further is operable to switch from said fine adjustment mode to said coarse adjustment mode when said digital error signal is greater than a third predetermined signal level greater than said second predetermined signal level; said control means including means for establishing, for a predetermined period of time, said digital error signal at a level corresponding to a level of said digital error signal prior to when said digital error signal is greater than said third predetermined signal level.

4. The apparatus of claim 2, wherein said control means switches from said coarse adjustment mode to said fine adjustment mode when said digital error signal continuously is less than said first predetermined signal level for a predetermined period of time, and immediately switches from said fine adjustment mode to said coarse adjustment mode when said digital error signal is greater than said second predetermined signal level.

5. The apparatus of claim 4, wherein said predetermined period of time corresponds to three vertical scanning periods of said analog image signal.

6. The apparatus of claim 1, wherein the received analog image signal is comprised of a plurality of image signals each corresponding to a respective color; said control means is operable to detect a respective amount of error for each respective color of the received analog image signal, to generate respective digital error signals from the respective detected amounts of errors, to switch from said coarse adjustment mode to said fine adjustment mode when all of said digital error signals are smaller than a first predetermined signal level, and to switch from said fine adjustment mode to said coarse adjustment mode when any one of said digital error signals is greater than a second predetermined signal level, said second predetermined signal level being greater than or equal to said first predetermined signal level.

7. The apparatus of claim 1, wherein said control means includes means for generating a pulse width modulated signal corresponding to the digital error signal; and generates said analog control signal from the pulse width modulated signal.

8. The apparatus of claim 7, wherein said control means generates said pulse width modulated signal a predetermined number of times during a time corresponding to a video portion of each period not in said reference zone of said analog image signal.

9. The apparatus of claim 8, wherein said image signal represents a video signal, each of said periods of said analog image signal represents a vertical interval, and said reference zone of each said period represents a pixel zone having an optical black level.

10. The apparatus of claim 1, wherein said means for receiving is an imaging sensor for imaging an image to produce said analog image signal; and said reference zone represents a pixel zone having an optical black level.

11. Method of clamping an image signal, comprising the steps of:

receiving an analog image signal having a plurality of periods, each of said periods including a reference zone;

varying a level of said reference zone in said analog image signal in accordance with an analog control signal to produce a varied analog image signal;

converting the varied analog image signal to a digital image signal;

generating a digital zone value signal corresponding to a level of said digital image signal in the reference zone;

digitally detecting an amount of error between said digital zone value signal and a predetermined zone value;

generating a digital error signal having a predetermined number of data bits from the detected amount of error;

switching between a coarse adjustment mode and a fine adjustment mode in accordance with a level of said digital error signal;

generating said analog control signal, in said coarse adjustment mode, from most significant ones of said data bits of the digital error signal; and generating said analog control signal, in said fine adjustment mode, from least significant ones of said data bits of the digital error signal.

12. The method of claim 11, wherein said step of switching is carried out by switching from said coarse adjustment mode to said fine adjustment mode when said digital error signal is less than a first predetermined signal level, and by switching from said fine adjustment mode to said coarse adjustment mode when said digital error signal is greater than a second predetermined signal level, said second predetermined signal level being greater than or equal to said first predetermined signal level to produce a hysteresis effect.

13. The method of claim 12, wherein said step of switching further is carried out by switching from said fine adjustment mode to said coarse adjustment mode when said digital error signal is greater than a third predetermined signal level greater than said second predetermined signal level; said method further comprising the step of establishing, for a predetermined period of time, said digital error signal at a level corresponding to a level of said digital error signal prior to when said digital error signal is greater than said third predetermined signal level.

14. The method of claim 12, wherein said step of switching is carried out by switching from said coarse adjustment mode to said fine adjustment mode when said digital error signal continuously is less than said first predetermined signal level for a predetermined period of time, and by switching immediately from said fine adjustment mode to said coarse adjustment mode when said digital error signal is greater than said second predetermined signal level.

15. The method of claim 14, wherein said predetermined period of time corresponds to three vertical scanning periods of said analog image signal.

16. The method of claim 11, wherein the received analog image signal is comprised of a plurality of image signals each corresponding to a respective color; said step of digitally detecting is carried out by detecting a respective amount of error for each respective color of the received analog image signal; said step of generating a digital error is carried out by generating respective digital error signals from the respective detected amounts of errors; and said step of switching is carried out by switching from said coarse adjustment mode to said fine adjustment mode when all of said digital error signals are smaller than a first predetermined signal level, and by switching from said fine adjustment mode to said coarse adjustment mode when any one of said digital error signals is greater than a second predetermined signal level, said second predetermined signal level being greater than or equal to said first predetermined signal level.

17. The method of claim 11, further comprising the step of generating a pulse width modulated signal corresponding to the digital error signal and the adjustment mode; and said steps of generating said analog control signal are carried out by generating said analog control signal from the pulse width modulated signal.

18. The method of claim 17, wherein said step of generating said pulse width modulated signal is carried out a predetermined number of times during a time corresponding to a video portion of each period not in said reference zone of said analog image signal.

19. The method of claim 18, wherein said image signal represents a video signal, each of said periods of said analog image signal represents a vertical interval, and said reference zone of each said period represents a pixel zone having an optical black level.

20. The method of claim 11, wherein said step of receiving is carried out by imaging an image using an imaging sensor to produce said analog image signal; and said reference zone represents a pixel zone having an optical black level.

* * * * *